United States Patent [19]

Hurter

[11] Patent Number: 5,644,040

[45] Date of Patent: Jul. 1, 1997

[54] AZO DYES HAVING TWO MONOAZO-CHROMOPHORES BOUND TO A HALOTRIAZINYL RADICAL PROCESSES FOR THEIR PREPARATION AND THEIR USE

[75] Inventor: Rudolf Hurter, Basel, Switzerland

[73] Assignee: Ciba-Geigy Corporation, Tarrytown, N.Y.

[21] Appl. No.: 560,265

[22] Filed: Nov. 21, 1995

[30] Foreign Application Priority Data

Dec. 2, 1994 [CH] Switzerland ............... 3651/94

[51] Int. Cl.$^6$ .................. C09B 62/09; D06P 1/382
[52] U.S. Cl. .................. 534/635; 534/588; 534/600; 534/637; 534/638; 534/782; 534/845; 534/862; 534/878
[58] Field of Search .................. 534/637, 635

[56] References Cited

U.S. PATENT DOCUMENTS

| | | |
|---|---|---|
| 3,040,021 | 6/1962 | Gunst . |
| 4,542,208 | 9/1985 | Odani et al. ............... 534/797 |
| 4,742,160 | 5/1988 | Dore et al. ............... 534/605 |
| 4,997,919 | 3/1991 | Schaulin ............... 534/637 |
| 5,006,128 | 4/1991 | Pedrazzi ............... 8/437 |
| 5,328,995 | 7/1994 | Schaulin et al. ............... 534/797 |

FOREIGN PATENT DOCUMENTS

| | | | |
|---|---|---|---|
| 0357560 | 3/1990 | European Pat. Off. ............... | 534/637 |
| 1544425 | 7/1969 | Germany ............... | 534/637 |
| 61-190561 | 8/1986 | Japan ............... | 534/637 |
| 62-07765 | 1/1987 | Japan ............... | 534/637 |
| 62-132966 | 6/1987 | Japan ............... | 534/637 |
| 1525280 | 9/1978 | United Kingdom ............... | 534/637 |
| 2036780 | 7/1980 | United Kingdom ............... | 534/637 |

OTHER PUBLICATIONS

Chemical Abstracts, 108 (18), 1988, 152086u Himeno (1988).
Chemical Abstracts, 106 (4), 1987, 19974z Hibara (1987).
Chemical Abstracts, 102, 1985, 222315v Ricoh (1985).

*Primary Examiner*—Floyd D. Higel
*Attorney, Agent, or Firm*—Kevin T. Mansfield

[57] ABSTRACT

Azo dyes of the formula (1)

in which $R_1$ and $R_2$ are hydrogen or $C_1$–$C_4$alkyl, $R_3$, $R_4$, $R_5$ and $R_6$ are hydrogen, $C_1$–$C_4$alkyl, $C_1$–$C_4$alkoxy, $C_2$–$C_4$alkanoylamino, ureido or halogen, X is chlorine or fluorine, $B_1$ is phenyl, naphthyl or heterocyclic radical, and $A_1$ is a radical of the formula (2)

in which $R^7$ is hydrogen, amino, N-mono- or N,N-di-$C_1$–$C_4$alkylamino or optionally substituted phenylamino and $R_8$ is hydrogen or hydroxyl, or $A_1$ is a radical of the formula (3)

in which $R_9$ is hydrogen, $C_1$–$C_8$alkyl or phenyl which is optionally substituted by $C_1$–$C_4$alkyl, $C_1$–$C_4$alkoxy, $C_2$–$C_2$–$C_4$alkanoylamino, ureido, halogen or sulfo, $R_{10}$ is hydrogen or $C_1$–$C_8$alkyl and $R_{11}$ is hydrogen, $C_1$–$C_4$alkyl, $C_1$–$C_4$alkoxy, $C_2$–$C_4$alkanoylamino, ureido, halogen or sulfo, and the azo dyes of the formula (1) contain at least one and not more than two sulfo groups, with the proviso that the radical of the formula (2) is not 6-sulfonaphth-2-yl, are particularly suitable for dyeing or printing cellulosic fibre materials or naturally occurring or synthetic polyamide fibre materials.

16 Claims, No Drawings

AZO DYES HAVING TWO MONOAZO-CHROMOPHORES BOUND TO A HALOTRIAZINYL RADICAL PROCESSES FOR THEIR PREPARATION AND THEIR USE

The present invention relates to novel azo dyes, processes for their preparation and the use of these dyes for dyeing and printing fibre materials, in particular textile fibre materials.

The present invention relates to azo dyes of the formula

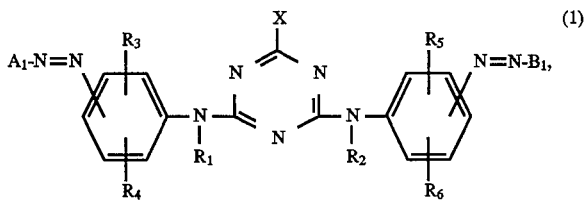

in which $R_1$ and $R_2$ independently on one another are hydrogen or $C_1$–$C_4$alkyl, $R_3$, $R_4$, $R_5$ and $R_6$ independently of one another are hydrogen, $C_1$–$C_4$alkyl, $C_1$–$C_4$alkoxy, $C_2$–$C_4$alkanoylamino, ureido or halogen, X is chlorine or fluorine, $B_1$ is a radical of the benzene series, of the naphthalene series or of the heterocyclic series, and $A_1$ is a radical of the formula

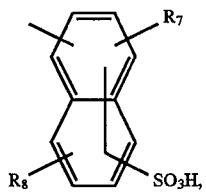

in which $R_7$ is hydrogen, amino, N-mono- or N,N-di-$C_1$–$C_4$alkylamino or substituted or unsubstituted phenylamino and $R_8$ is hydrogen or hydroxyl, or $A_1$ is a radical of the formula

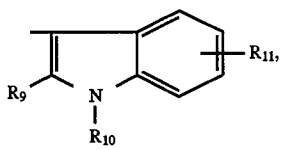

in which $R_9$ is hydrogen, $C_1$–$C_8$alkyl or phenyl which is unsubstituted or substituted by $C_1$–$C_4$alkyl, $C_1$–$C_4$alkoxy, $C_2$–$C_4$alkanoylamino, ureido, halogen or sulfo, Rio is hydrogen or $C_1$–$C_8$alkyl and $R_{11}$ is hydrogen, $C_1$–$C_4$alkyl, $C_1$–$C_4$alkoxy, $C_2$–$C_4$alkanoylamino, ureido, halogen or sulfo, and the azo dyes of the formula (1) contain at least one and not more than two sulfo groups, with the proviso that the radical of the formula (2) is not 6-sulfonaphth-2-yl.

$C_1$–$C_4$Alkyl $R_1$, $R_2$, $R_3$, $R_4$, $R_5$, $R_6$ and $R_{11}$ is methyl, ethyl, propyl, isopropyl, butyl, isobutyl, sec-butyl or tert-butyl, in particular methyl or ethyl.

$C_1$–$C_8$Alkyl $R_9$ and $R_{10}$ is, for example, methyl, ethyl, propyl, isopropyl, butyl, isobutyl, sec-butyl, tert-butyl or straight-chain or branched pentyl, hexyl, heptyl or octyl. $C_1$–$C_4$Alkyl $R_9$ and $R_{10}$ are preferred here, in particular methyl or ethyl.

$C_1$–$C_4$Alkoxy $R_3$, $R_4$, $R_5$, $R_6$ and $R_{11}$ are, for example, methoxy, ethoxy, propoxy, isopropoxy, butoxy, sec-butoxy, isobutoxy or tert-butoxy, in particular methoxy or ethoxy.

$C_2$–$C_4$Alkanoylamino $R_3$, $R_4$, $R_5$, $R_6$ and $R_{11}$ are, for example, acetylamino, propionylamino, or butyrylamino, in particular acetylamino.

Halogen $R_3$, $R_4$, $R_5$, $R_6$ and $R_{11}$ are, for example, fluorine or bromine, and in particular chlorine.

N-Mono- or N,N-di-$C_1$–$C_4$alkylamino $R_7$ is, for example, such a group with methyl or ethyl radicals. N-Mono-$C_1$–$C_4$alkylamines are preferred, for example —$NHC_2H_5$ or, in particular, —$NHCH_3$.

Substituted or unsubstituted phenylamino $R_7$ is, in addition to the unsubstituted radicals, for example, the radicals substituted in the phenyl ring by $C_1$–$C_4$alkyl, $C_1$–$C_4$alkoxy, $C_1$–$C_4$alkanoylamino, ureido, halogen or sulfo. Phenylamino which is unsubstituted or substituted in the phenyl ring by $C_1$–$C_4$alkyl, $C_1$–$C_4$alkoxy or halogen, in particular unsubstituted or substituted in the phenyl ring by $C_1$–$C_4$alkyl or $C_1$–$C_4$alkoxy, is preferred. The phenylamino radical is particularly preferably unsubstituted.

The radical $B_1$ is preferably a benzene, naphthalene, 6-hydroxypyrid-2-one, 1-phenyl-5-aminopyrazole, 1-phenylpyrazol-5-one or indole radical. K is preferably a benzene, naphthalene, 1-phenylpyrazol-5-one or indole radical, in particular a benzene, naphthalene or indole radical, and preferably a naphthalene or indole radical. Naphthalene radicals are of particular interest.

Examples of substituents of the radical $B_1$ are the following: $C_1$–$C_8$alkyl, in particular $C_1$–$C_4$alkyl, such as methyl, ethyl, propyl, isopropyl, butyl, isobutyl, sec-butyl or tert-butyl; $C_1$–$C_8$alkoxy, in particular $C_1$–$C_4$alkoxy, which is unsubstituted or substituted by hydroxyl, such as methoxy, ethoxy, propoxy, isopropoxy, butoxy, isobutoxy, sec-butoxy or tert-butoxy; $C_2$–$C_6$alkanoylamino, in particular $C_2$–$C_4$alkanoylamino, for example acetylamino or, in particular, acetylamino; halogen, for example fluorine or, in particular, chlorine; hydroxyl; cyano; carbamoyl; carboxyl; sulfo; sulfomethyl; ureido; phenyl; phenylamino; amino; or N-mono- or N,N-di-$C_1$–$C_4$alkylamino, in which the alkyl radicals can be substituted, for example by hydroxyl or phenyl. The phenyl radicals mentioned here can be unsubstituted or substituted, for example by $C_1$–$C_4$alkyl, $C_1$–$C_4$alkoxy, $C_2$–$C_4$alkanoylamino, ureido, halogen or sulfo.

$R_1$ and $R_2$ are preferably hydrogen.

$R_3$, $R_4$, $R_5$ and $R_6$ are preferably hydrogen, $C_1$–$C_4$alkyl, $C_1$–$C_4$alkoxy, halogen or ureido, in particular hydrogen, $C_1$–$C_4$alkyl, $C_1$–$C_4$alkoxy or halogen and particularly preferably hydrogen.

X is preferably chlorine.

$R_7$ is preferably hydrogen, amino or phenylamino, in particular hydrogen or amino.

Preferred radicals of the formula (2) are those in which $R_7$ and $R_8$ are hydrogen, or in particular those in which $R_7$ is amino and $R_8$ is hydroxyl.

The radical of the formula (2) is preferably bonded to the azo bridge in the 1-position.

$R_9$ is preferably hydrogen or, in particular, phenyl which is unsubstituted or substituted by $C_1$–$C_4$alkyl, $C_1$–$C_4$alkoxy or halogen. $R_9$ is particularly preferably phenyl.

$R_{10}$ is preferably hydrogen or $C_1$–$C_4$alkyl, in particular hydrogen.

$R^{11}$ is preferably sulfo.

Preferred radicals of the formula (3) are those in which $R_9$ is phenyl which is unsubstituted or substituted by $C_1-C_4$alkyl, $C_1-C_4$alkoxy or halogen, in particular unsubstituted phenyl, $R_{10}$ is hydrogen and $R_{11}$ is sulfo.

$B_1$ is preferably a radical of the formula

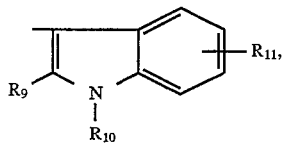 (3)

in which $R_9$ is hydrogen, $C_1-C_8$alkyl or phenyl which is unsubstituted or substituted by $C_1-C_4$alkyl, $C_1-C_4$alkoxy, $C_2-C_4$alkanoylamino, ureido, halogen or sulfo, $R_{10}$ is hydrogen or $C_1-C_4$alkyl and $R_{11}$ is hydrogen, $C_1-C_4$alkyl, $C_1-C_4$alkoxy, $C_2-C_4$alkanoylamino ureido, halogen or sulfo; or a radical of the formula

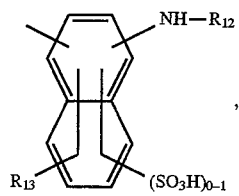 (4)

in which $R_{12}$ is hydrogen, $C_1-C_4$alkyl or phenyl which is unsubstituted or substituted by $C_1-C_4$alkyl, $C_1-C_4$alkoxy, $C_2-C_4$alkanoylamino, ureido, halogen or sulfo and $R_{13}$ is hydrogen, $C_1-C_4$alkyl, $C_1-C_4$alkoxy, $C_1-C_4$alkanoylamino, ureido, halogen or hydroxyl;

or a radical of the formula

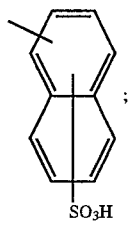 (5)

or a radical of the formula

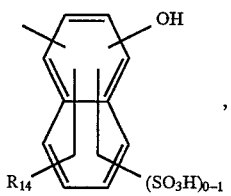 (6)

in which $R_4$ is hydrogen, $C_1-C_4$alkyl, $C_1-C_4$alkoxy, $C_1-C_4$alkanoylamino, ureido or halogen; or a radical of the formula

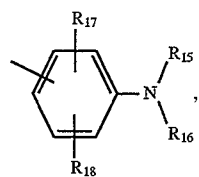 (7)

in which $R_{15}$ and $R_{16}$ independently of one another are hydrogen or $C_1-C_4$alkyl which is unsubstituted or substituted by hydroxyl or phenyl, in which the phenyl radical is unsubstituted or substituted by $C_1-C_4$alkyl, $C_1-C_4$alkoxy, $C_2-C_4$alkanoylamino, ureido, halogen or sulfo, and $R_{17}$ and $R_{18}$ independently of one another are hydrogen, $C_1-C_4$alkyl, $C_1-C_4$alkoxy, $C_2-C_4$alkanoylamino, ureido, halogen or sulfo;

or a radical of the formula

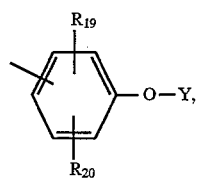 (8)

in which

Y is hydrogen or $C_1-C_4$alkyl which is unsubstituted or substituted by hydroxyl and $R_{19}$ and $R_{20}$ independently of one another are hydrogen, $C_1-C_4$alkyl, $C_1-C_4$alkoxy, $C_2-C_4$alkanoylamino, ureido, halogen or sulfo;

or a radical of the formula

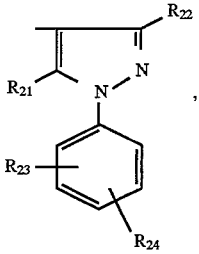 (9)

in which $R_{21}$ is amino or hydroxyl, $R_{22}$ is methyl or carboxyl and $R_{23}$ and $R_{24}$ independently of one another are hydrogen, $C_1-C_4$alkyl, $C_1-C_4$alkoxy, $C_2-C_4$alkanoylamino, ureido, halogen or sulfo;

or a radical of the formula (10)

HO — N(R_27) — structure with R_25, R_26 in which $R_{25}$ is hydrogen or $C_1-C_4$alkyl, $R_{26}$ is cyano, carbamoyl or sulfomethyl and $R_{27}$ is hydrogen, $C_1-C_4$alkyl or phenyl which is unsubstituted or substituted by $C_1-C_4$alkyl, $C_1-C_4$alkoxy, $C_2-C_4$alkanoylamino, ureido, halogen or sulfo.

The above preferences apply to the radical $B_1$ of the formula (3).

Preferred radicals $B_1$ of the formula (4) are those in which
$R_{12}$ is hydrogen, $C_1$–$C_4$alkyl or phenyl and
$R_{13}$ is hydrogen or hydroxyl.

Preferred radicals $B_1$ of the formula (6) are those in which $R_{14}$ is hydrogen.

The radicals of the formula (6) preferably contain a sulfo group.

Preferred radicals $B_1$ of the formula (7) are those in which
$R_{15}$ and $R_{16}$ independently of one another are hydrogen or $C_1$–$C_4$alkyl which is unsubstituted or substituted by hydroxyl or phenyl, in which the phenyl radical is unsubstituted or substituted by sulfo, and $R_{17}$ and $R_{18}$ independently of one another are hydrogen, $C_1$–$C_4$alkyl or $C_1$–$C_4$alkoxy.

Preferred radicals $B_1$ of the formula (8) are those in which
Y is hydrogen or $C_1$–$C_4$alkyl, in particular hydrogen, and
$R_{19}$ and $R_{20}$ independently of one another are hydrogen, $C_1$–$C_4$alkyl or $C_1$–$C_4$alkoxy.

Preferred radicals $B_1$ of the formula (9) are those in which
$R_{21}$ is hydroxyl,
$R_{22}$ is methyl and
$R_{23}$ and $R_{24}$ independently of one another are hydrogen $C_1$–$C_4$alkyl, $C_1$–$C_4$alkoxy or sulfo.

Preferred radicals $B_1$ of the formula (10) are those in which
$R_{25}$ is $C_1$–$C_4$alkyl,
$R_{26}$ is cyano or carbamoyl and
$R_{27}$ is $C_1$–$C_4$alkyl.

$B_1$ is particularly preferably a radical of the formula (3), (4), (5), (6), (7) or (8), in particular a radical of the formula (3), (4) or (5), and preferably a radical of the formula (3) or (4). $B_1$ is particularly preferably a radical of the formula (4).

Preferred azo dyes of the formula (1) are those in which
$B_1$ is a radical of the formula (3), (4) or (5), $R_1$ and $R_2$ are hydrogen, $R_3$, $R_4$, $R_5$ and $R_6$ independently of one another are hydrogen, $C_1$–$C_4$alkyl, $C_1$–$C_4$alkoxy or halogen, $R_7$ is hydrogen, amino or phenylamino, $R_9$ is phenyl which is unsubstituted or substituted by $C_1$–$C_4$alkyl, $C_1$–$C_4$alkoxy or halogen, $R_{10}$ is hydrogen and
$R_{11}$ is sulfo.

Radicals $B_1$ which are of particular interest are those of the formulae

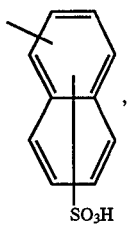 (5)

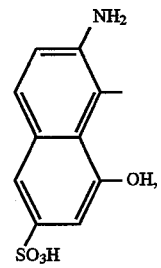 (11)

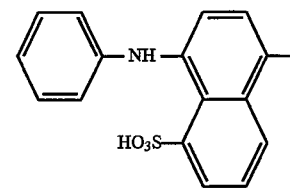 (12)

and

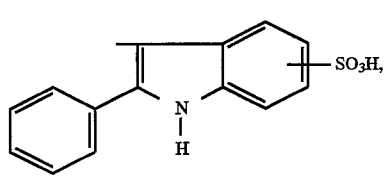 (13)

in particular those of the formulae (5), (11) and (13), preferably those of the formulae (5) and (11).

The radicals of the formulae (5), (11), (12) and (13), in particular the radicals of the formulae (5), (11) and (13), preferably the radicals of the formulae (5) and (11), are furthermore of particular interest as radicals $A_1$, where a radical of $A_1$ of the formula (5) is not 6-sulfonaphth-2-yl.

$A_1$ and $B_1$ are preferably independently of one another a radical of the formula (5), (11), (12) or (13), in particular a radical of the formula (5), (11) or (13), preferably a radical of the formula (5) or (11).

The radicals $A_1$ and $B_1$ are particularly preferably identical.

The radicals $A_1$ and $B_1$ are particularly preferably identical and are a radical of the formula (5), (11), (12) or (13), in particular a radical of the formula (5), (11) or (13), preferably a radical of the formula (5) or (11).

Azo dyes which are of special interest are those of the formula

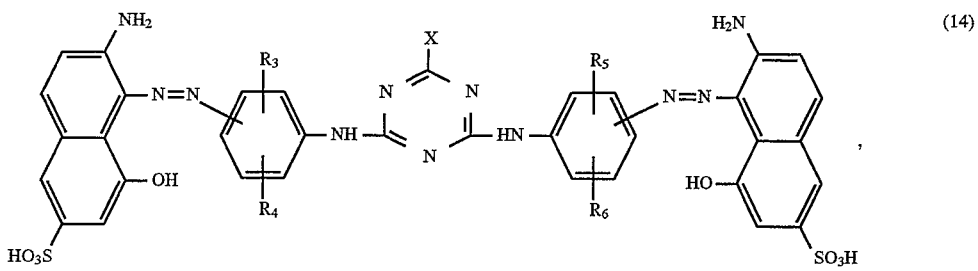

in which $R_3$, $R_4$, $R_5$ and $R_6$ independently of one another are hydrogen, $C_1$–$C_4$alkyl, $C_1$–$C_4$alkoxy or halogen, in particular hydrogen.

X in this formula is preferably chlorine.

The present invention furthermore relates to a process for the preparation of azo dyes of the formula (1), which comprises subjecting cyanuric chloride or cyanuric fluoride to a condensation reaction with the amines of the formulae

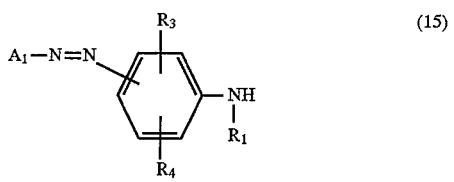

and

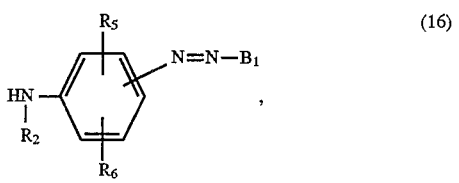

in which $R_1$, $R_2$, $R_3$, $R_4$, $R_5$, $R_6$, $A_1$ and $B_1$ are as defined under formula (1).

Preferably, the cyanuric chloride or cyanuric fluoride is initially reacted in approximately stoichiometric amounts with one of the aminoazo compounds of the formulae (15) and (16) at a temperature of –5° to 20° C., the pH being kept neutral to slightly acid, preferably at 5 to 7, by addition of suitable bases, for example alkali metal bases, such as lithium hydroxide or carbonate, sodium hydroxide or carbonate or potassium hydroxide or carbonate. The resulting triazine derivative can be separated off, or the reaction mixture can be used directly for a further reaction. Approximately stoichiometric amounts of the other of the aminoazo compounds of the formulae (15) and (16) are advantageously added to the resulting reaction mixture or the triazine derivative which has been separated off beforehand, and this is reacted with the triazine derivative at slightly elevated temperature, preferably at 30° to 50° C., and at a neutral to slightly acid pH, which is preferably 6 to 7. If the compounds of the formulae (15) and (16) are identical aminoazo compounds, about 2 equivalents of this aminoazo dye is reacted with 1 equivalent of cyanuric chloride or cyanuric fluoride, the temperature preferably first being kept at –5° to 20° C. and then being increased to about 30° to 50° C.

The compounds of the formulae (15) and (16) am known or can be prepared analogously to known compounds. These azo compounds can thus be obtained by generally customary diazotization and coupling reactions.

The diazotization is usually carried out with a nitrite, for example with an alkali metal nitrite, such as sodium nitrite, in a mineral acid medium, for example in a hydrochloric acid medium, at temperatures of, for example, –5° to 30° C, and preferably at 0° to 10° C.

The coupling is usually carried out at acid, neutral to weakly alkaline pH values and at temperatures of, for example, –5° to 30° C., preferably 0° to 25° C.

The dyes of the formula (1) are present either in the form of their free acid or, preferably, as salts thereof.

Salts are for example, the alkali metal or ammonium s or the salts of an anic amine.

Examples are the sodium, lithium, potassium or ammonium salts or the salt of mono-, di- or triethanolamine.

The azo dyes of the formula (1) according to the invention are suitable for dyeing and printing, in particular of fibre materials containing nitrogen or hydroxyl groups, paper or leather, for example textile fibre materials of cellulose, silk and, in particular, wool and synthetic polyamides, by methods known per se. The azo dyes of the formula (1) according to the invention can be used for dyeing and printing in the generally customary form, which has been prepared beforehand if appropriate.

Level dyeings with good all round fastness properties, in particular good fastness to rubbing, wet processing, wet rubbing and light, are obtained. The dyes according to the invention furthermore have a very good exhaustion capacity. The dyes according to the invention moreover have a very good build-up capacity and can very readily be combined with other dyes. The abovementioned textile material can be in widely varying processing forms, for example as fibre, yarn, woven fabric or knitted fabric.

In the following examples, parts are parts by weight. The temperatures are degrees Celsius. Parts by weight and parts by volume bear the same relationship as that between the gram and the cubic centimeter.

Preparation Example 1: 34.5 parts of p-nitroaniline are diazotized with sodium nitrite under hydrochloric acid conditions in the customary manner.

The diazo solution thus prepared is added at room temperature to a second solution which comprises 59.8 parts of 2-amino-8-naphthol-6-sulfonic acid and 250 parts of water. The coupling reaction is allowed to proceed for 20 hours and the pH is then brought to a value of 9.5 by means of aqueous sodium hydroxide solution (30%). A suspension which comprises the compound, stated in the form of the free acid, of the formula

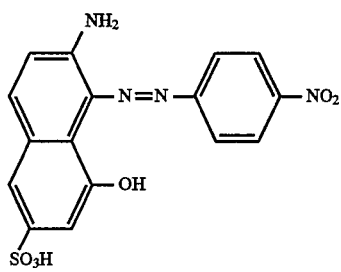

(101)

1000 parts of the suspension thus obtainable are heated to the temperature of 55° C. and 39 parts of sodium sulfide are added. The resulting solution is subsequently stirred at a temperature of 72° to 75° C. for 15 minutes and then clarified by filtration. After addition of 90 parts of an aqueous sodium hydroxide solution (30%), the precipitate formed is filtered off after some time, washed with aqueous sodium chloride solution (15%) and dried in vacuo at a temperature of 50° to 60° C. 83 parts of a compound which, in the form of the free acid, corresponds to the formula

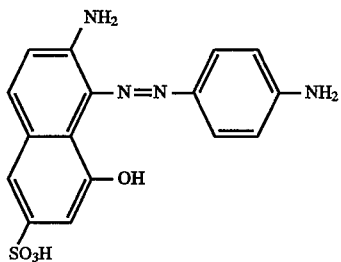

(102)

are obtained.

Preparation Example 2: After stirring into 200 parts of water and 50 parts of hydrochloric acid (32%), 30 parts of 4-aminoacetanilide are diazotized at a temperature of 5° to 10° C. with 50 parts of a 4 normal sodium nitrite solution. Excess nitrite is destroyed with a little sulfamic acid.

The diazo solution thus prepared is allowed to run into a second solution which comprises 59.9 parts of phenyl-periacid and 600 parts of water and has been brought to a pH of 8 with aqueous sodium hydroxide solution. While the diazo solution is running in, the pH is kept at a value of 8 to 9 by addition of aqueous sodium hydroxide solution. The resulting compound is then precipitated by addition of sodium chloride, filtered off, washed with aqueous sodium chloride solution and dried in vacuo at a temperature of 50° to 60° C. 102 parts of a compound which, in the form of the free acid, corresponds to the formula

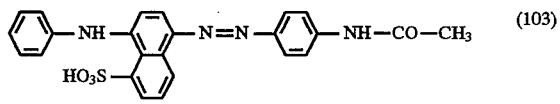

(103)

are obtained.

100 parts of the compound of the formula (103) obtainable as described above are hydrolyzed at the boil in 225 parts of water and 112 parts of an aqueous sodium hydroxide solution (30%). The resulting mass is diluted with water, filtered hot and washed with aqueous sodium chloride solution (15%). After drying in vacuo at a temperature of 50° to 60° C., 75 parts of a compound which, in the form of the free acid, corresponds to the formula

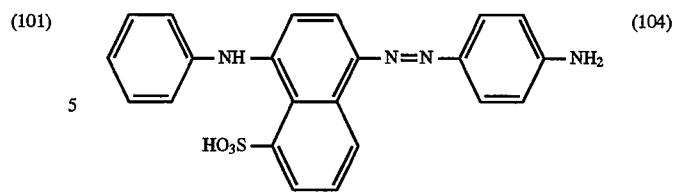

(104)

are obtained.

Preparation Example 3: 45 parts of 3-aminoacetanilide are diazotized in 450 parts of ice-water and 75 parts of hydrochloric acid (32%) with 75 parts of a 4 normal sodium nitrite solution at a temperature of 0° to 5° C.

The diazo solution thus prepared is added to a second solution which comprises 81.9 parts of 2-phenylindole-5-sulfonic acid and 450 parts of water. After about 18 hours, the reaction product which has precipitated out is filtered off and washed with water. A compound which, in the form of the free acid, corresponds to the formula

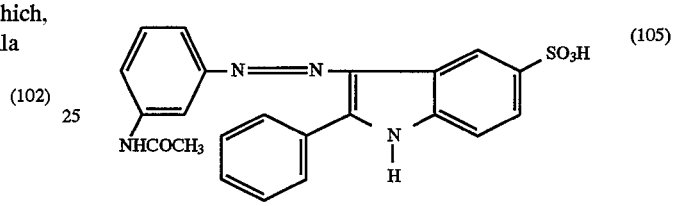

(105)

is obtained.

309 parts of the compound of the formula (105) obtainable as described above are hydrolyzed at the boil in 250 parts of water and 250 parts of an aqueous sodium hydroxide solution (30%). The solution is brought to a pH of 10 with 150 parts of acetic acid (80%).

The product which has precipitated out is then filtered off and washed with aqueous sodium chloride solution (2.5%). After drying in vacuo at a temperature of 50° to 60° C., 100 parts of a compound which, in the form of the free acid, corresponds to the formula

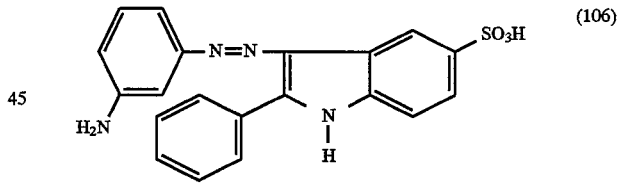

(106)

are obtained.

Preparation Example 4: 11.14 parts of 1-naphthylamine-5-sulfonic acid are dissolved in 100 parts of water at room temperature and at a pH of 7 to 8. After addition of 12.5 parts of 4 normal sodium nitrite solution, the solution thus obtained is added dropwise to a mixture comprising 100 parts of ice and 12.5 parts of hydrochloric acid (32%). After some time, excess nitrite is destroyed with sulfamic acid.

To prepare a second solution, 10.85 parts of 2-methoxyanilinomethanesulfonic acid are dissolved in 100 parts of water at a pH of 8. After admixing 6.3 parts of sodium bicarbonate, the diazo component solution obtainable as described above is added dropwise and the pH is kept at a value of 6.5 to 7 by addition of a further 1.8 parts of sodium bicarbonate. The resulting compound is then precipitated out by addition of sodium chloride and filtered off. 72 parts of a compound which, in the form of the free acid, corresponds to the formula

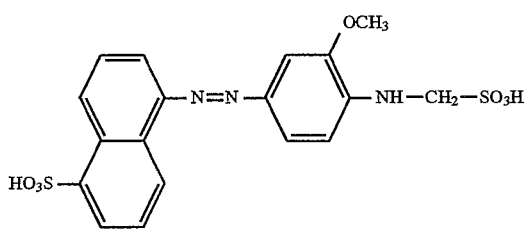 (107)

are obtained.

72 parts of the compound of the formula (107) obtainable as described above are stirred in 200 parts of water, and 20 parts of sodium hydroxide are added. After hydrolysis at the boiling point, a pH of 10 is established with 45 parts of hydrochloric acid (32%) and the resulting compound is filtered off at room temperature, washed with an aqueous sodium chloride solution and dried in vacuo at a temperature of 50° to 60° C. 16 parts of a compound which, in the form of the free acid, corresponds to the formula

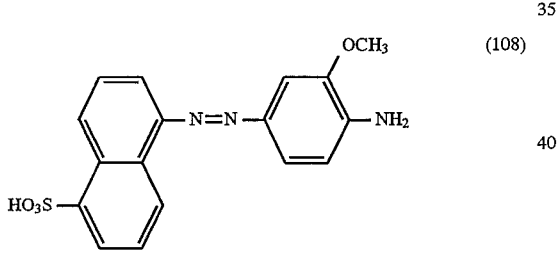 (108)

are obtained.

Example 1: 1.85 parts of cyanuric chloride are ground in 25 parts of ice, 5 parts of water and 0.1 part of disodium hydrogen phosphate for 30 minutes, while cooling with ice.

To prepare a second solution, 7.16 parts of the compound of the formula

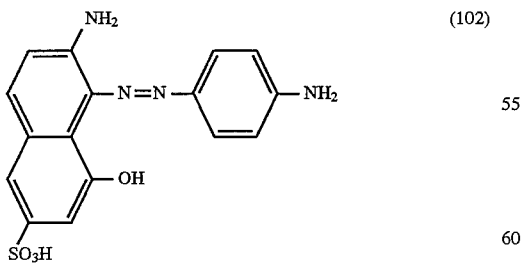 (102)

are dissolved in 9 to 160 parts of water at a temperature of 25° to 30° C. and a pH of 8.5 to 9. The resulting solution of the compound of the formula (102) is added dropwise to the cyanuric chloride slurry obtained as described above. The mixture is then heated slowly to a temperature of 45° to 50° C. and the pH is increased to a value of 9 by addition of aqueous sodium hydroxide solution. The reaction mixture is subsequently diluted with ethanol and then filtered. After washing with an ethanol/water mixture (in a ratio of 1:1), the dye is dried at a temperature of 50° to 60° C in vacuo. 5.4 parts of a dye which, in the form of the free acid, corresponds to the compound of the formula

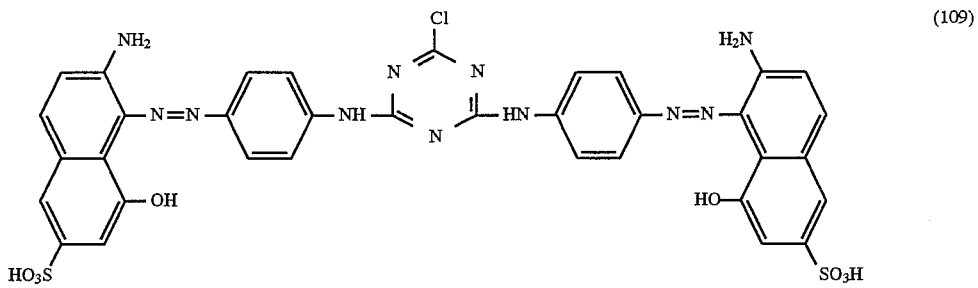 (109)

and which dyes wool and synthetic polyamide fibre material in red colour shades are obtained.

Examples 2 to 41: Dyes of the general formula

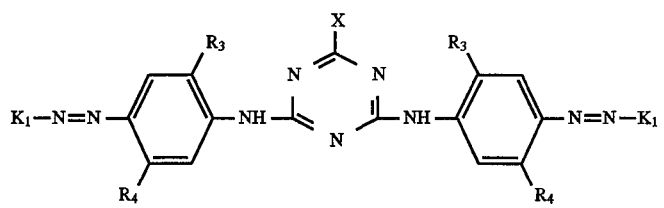

(110)

in which $K_1$, $R_3$, $R_4$ and X are as defined in columns 2, 3, 4 and 5 in the following Table 1, can be obtained analogously to the instructions in Example 1. The dyes given in the following Table 1 dye wool and synthetic polyamide fibre material in the colour shades stated in column 6.

TABLE 1

| Ex. | $K_1$ | $R_3$ | $R_4$ | X | Colour shade |
|---|---|---|---|---|---|
| 2 | (2-amino-8-hydroxy-6-sulfo-naphthyl) | —H | —H | —F | Red |
| 3 | (2-amino-8-hydroxy-6-sulfo-naphthyl) | —H | —CH$_3$ | —Cl | Red |
| 4 | (2-amino-8-hydroxy-6-sulfo-naphthyl) | —CH$_3$ | —H | —Cl | Red |
| 5 | (2-amino-8-hydroxy-6-sulfo-naphthyl) | —OCH$_3$ | —H | —Cl | Red |

TABLE 1-continued
| Ex. | K₁ | R₃ | R₄ | X | Colour shade |
|---|---|---|---|---|---|
| 6 | 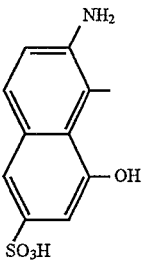 | —H | —OCH₃ | —Cl | Red |
| 7 | 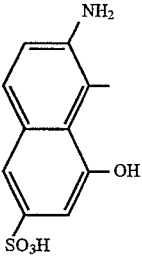 | —H | —Cl | —Cl | Red |
| 8 | 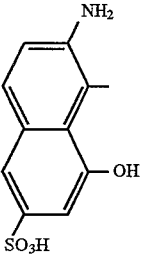 | —H | —Cl | —F | Red |
| 9 | 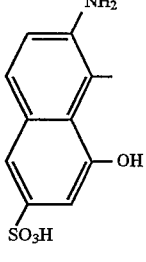 | —H | —CH₃ | —F | Red |
| 10 | 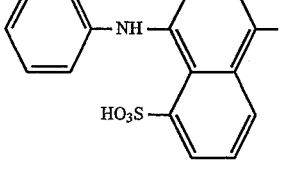 | —H | —H | —Cl | Red |
| 11 | 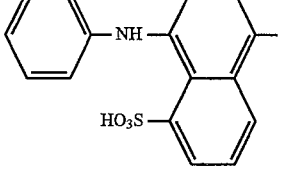 | —H | —Cl | —Cl | Red |

TABLE 1-continued

| Ex. | K₁ | R₃ | R₄ | X | Colour shade |
|---|---|---|---|---|---|
| 12 | [naphthalene with NH-phenyl and HO₃S substituents] | —H | —CH₃ | —Cl | Red |
| 13 | [naphthalene with NH₂, OH, SO₃H substituents] | —H | —H | —Cl | Yellow |
| 14 | [naphthalene with NH₂ and SO₃H substituents] | —H | —H | —Cl | Orange |
| 15 | [naphthalene with H₂N and HO₃S substituents] | —H | —H | —Cl | Scarlet |
| 16 | [indole with HO₃S and 2-phenyl substituents] | —H | —H | —Cl | Yellow |
| 17 | [naphthalene with HO₃S substituent] | —OCH₃ | —H | —Cl | Orange |
| 18 | [naphthalene with SO₃H substituent] | —H | —H | —Cl | Orange |
| 19 | [naphthalene with SO₃H substituent] | —H | —NHCOCH₃ | —Cl | Yellow |

TABLE 1-continued

| Ex. | K₁ | R₃ | R₄ | X | Colour shade |
|---|---|---|---|---|---|
| 20 | 6-naphthyl-1-SO₃H | —H | —NHCONH₂ | —Cl | Yellow |
| 21 | 6-naphthyl-1-SO₃H | —H | —OCH₃ | —Cl | Yellow |
| 22 | 6-naphthyl-1-SO₃H | —H | —CH₃ | —Cl | Yellow |
| 23 | 6-naphthyl-1-SO₃H | —OCH₃ | —H | —Cl | Yellow |
| 24 | 6-naphthyl-1-SO₃H | —CH₃ | —H | —Cl | Yellow |
| 25 | 6-naphthyl-1-SO₃H (2-isomer) | —H | —NHCONH₂ | —Cl | Yellow |
| 26 | 6-naphthyl-1-SO₃H (2-isomer) | —H | —OCH₃ | —Cl | Yellow |
| 27 | 6-naphthyl-1-SO₃H (2-isomer) | —OCH₃ | —H | —Cl | Yellow |
| 28 | 4-naphthyl-1-SO₃H | —H | —NHCOCH₃ | —Cl | Orange |
| 29 | 4-naphthyl-1-SO₃H | —H | —NHCONH₂ | —Cl | Orange |

TABLE 1-continued

| Ex. | K₁ | R₃ | R₄ | X | Colour shade |
|---|---|---|---|---|---|
| 30 | HO₃S-naphthyl (1,4; SO₃H at 5) | —H | —OCH₃ | —Cl | Orange |
| 31 | HO₃S-naphthyl (1,4; SO₃H at 5) | —H | —CH₃ | —Cl | Orange |
| 32 | HO₃S-naphthyl (1,4; SO₃H at 5) | —OCH₃ | —H | —Cl | Orange |
| 33 | HO₃S-naphthyl (1,4; SO₃H at 5) | —CH₃ | —H | —Cl | Orange |
| 34 | HO₃S-naphthyl | —H | —NHCOCH₃ | —Cl | Orange |
| 35 | HO₃S-naphthyl | —H | —NHCONH₂ | —Cl | Orange |
| 36 | HO₃S-naphthyl | —H | —OCH₃ | —Cl | Orange |
| 37 | HO₃S-naphthyl | —H | —CH₃ | —Cl | Orange |

TABLE 1-continued

| Ex. | K₁ | R₃ | R₄ | X | Colour shade |
|---|---|---|---|---|---|
| 38 | 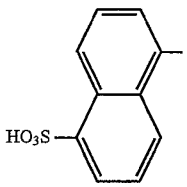 | —CH₃ | —H | —Cl | Orange |
| 39 | 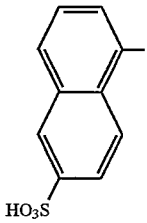 | —H | —NHCONH₂ | —Cl | Orange |
| 40 | 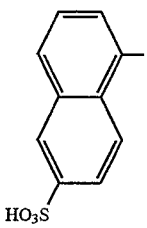 | —H | —OCH₃ | —Cl | Orange |
| 41 | 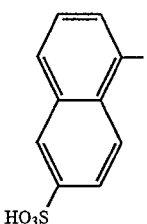 | —OCH₃ | —H | —Cl | Orange |

Examples 42 to 48: Dyes of the General Formula

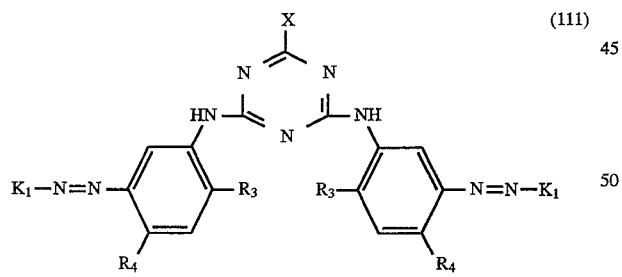 (III)

in which $K_1$, $R_3$, $R_4$ and X are as defined in columns 2, 3, 4 and 5 in the following Table 2, can be obtained analogously to the instructions in Example 1. The dyes given in the following Table 2 dye wool and synthetic polyamide fibre material in the colour shades stated in column 6.

TABLE 2
| Ex. | K₁ | R₃ | R₄ | X | Colour shade |
|---|---|---|---|---|---|
| 42 | 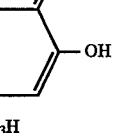 | −H | −H | −Cl | Scarlet |
| 43 | 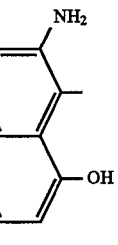 | −H | −H | −F | Scarlet |
| 44 | 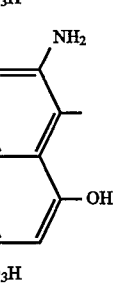 | −H | −CH₃ | −Cl | Red |
| 45 | 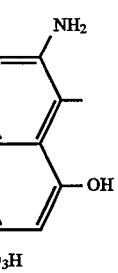 | −OCH₃ | −H | −Cl | Red |
| 46 | 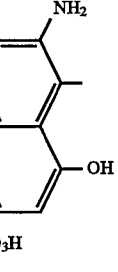 | −CH₃ | −H | −Cl | Red |
| 47 | 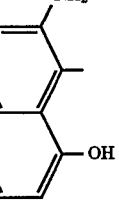 | −H | −Cl | −Cl | Red |

TABLE 2-continued

| Ex. | K₁ | R₃ | R₄ | X | Colour shade |
|-----|----|----|----|----|--------------|
| 48  | 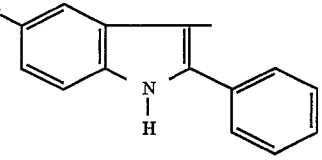 | —H | —H | —Cl | Yellow |

Example 49: 1.85 parts of cyanuric chloride are ground in 26 parts of ice, 5 parts of water and 0.1 part of disodium hydrogen phosphate for 30 minutes, while cooling with ice.

To prepare a second solution, 3.58 parts of the compound of the formula

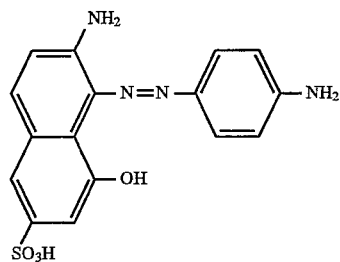
(102)

are dissolved in 80 parts of water at a temperature of 25° to 30° C. and a pH of 8.5 to 9. The resulting solution of the compound of the formula (102) is added dropwise to the cyanuric chloride slurry obtained as described above. After the solution has been diluted with a little acetone, it is kept at a temperature of 10° to 15° C. and at a pH of 5, by addition of dilute aqueous sodium hydroxide solution, until the reaction has ended. The end of the reaction is determined by thin layer chromatography. 130 pans of a suspension which comprises the compound, shown in the form of the free acid, of the formula

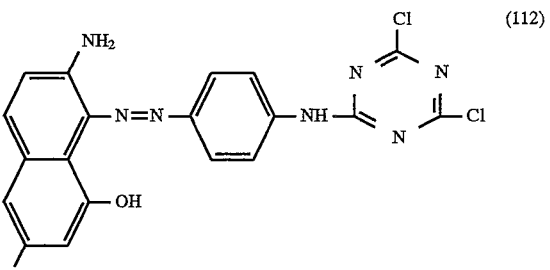
(112)

are obtained.

A solution which comprises 3.58 parts of the compound of the formula

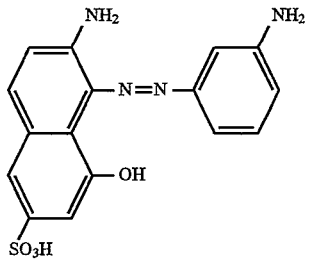
(113)

in 100 parts of water at a pH of 8.5 and at a temperature of 40° C. is added to the suspension obtainable as described above. The mixture is heated to a temperature of 35° to 40° C. and the pH is kept constant at a value of 7 with dilute aqueous sodium hydroxide solution. When the reaction has ended, the mixture is diluted with a little acetone and filtered and the residue is washed with acetone and dried in vacuo at a temperature of 50 to 60° C. A dye which, in the form of the free acid, corresponds to the compound of the formula

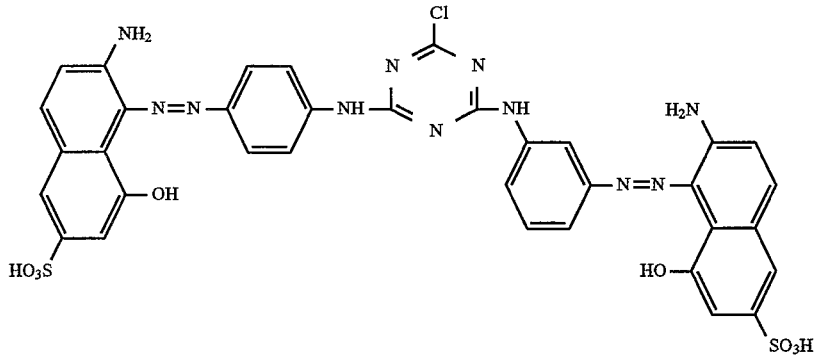
(114)

and which dyes wool and synthetic polyamide fibre material in red colour shades is obtained.
Examples 50 to 64: The dyestuffs shown in column 2 in the following table, which dye wool and synthetic polyamide fibre material in the colour shades shown in column 3, can be obtained analogously to the instructions in Example 49.
TABLE 3
| Ex. | Dye | Colour shade |
|---|---|---|
| 50 | 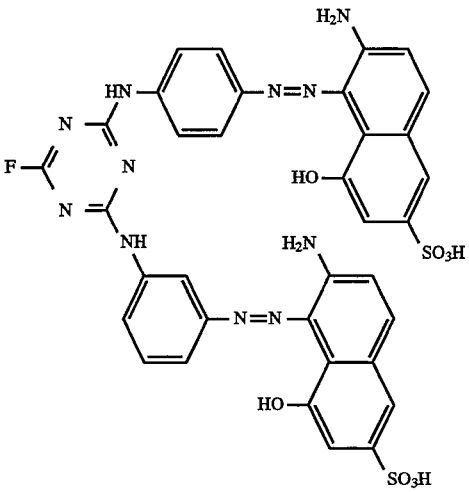 | Red |
| 51 | 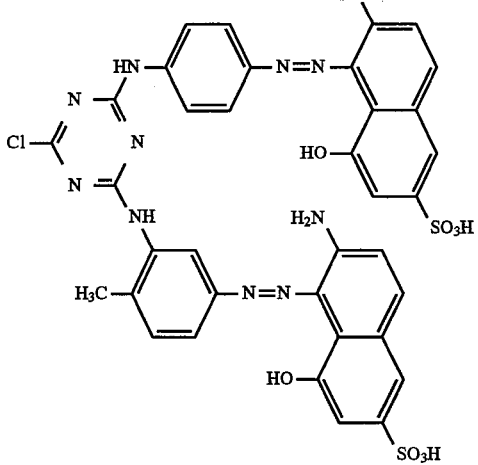 | Red |

TABLE 3-continued

| Ex. | Dye | Colour shade |
|-----|-----|--------------|
| 52  | (structure) | Red |
| 53  | (structure) | Red |

TABLE 3-continued
| Ex. | Dye | Colour shade |
|---|---|---|
| 54 | 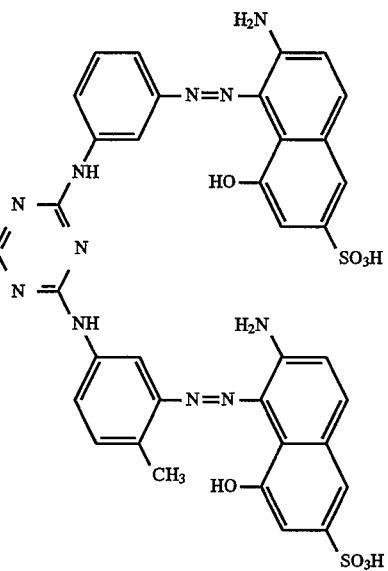 | Red |
| 55 | 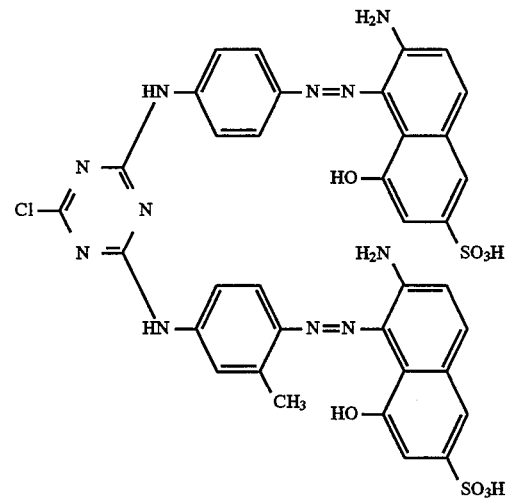 | Red |
| 56 | 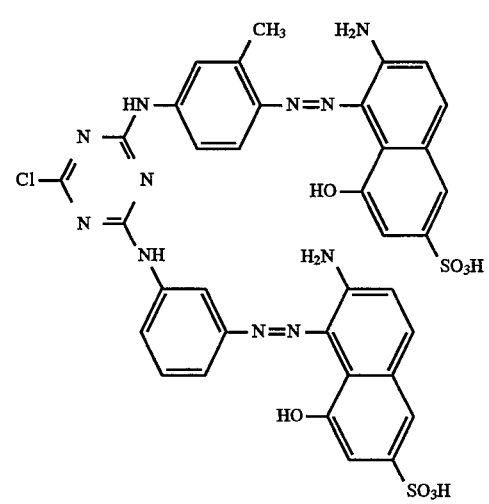 | Red |

TABLE 3-continued
| Ex. | Dye | Colour shade |
|---|---|---|
| 57 | 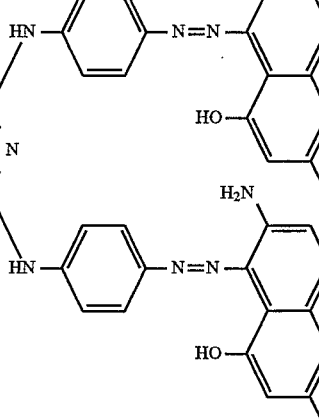 | Red |
| 58 | 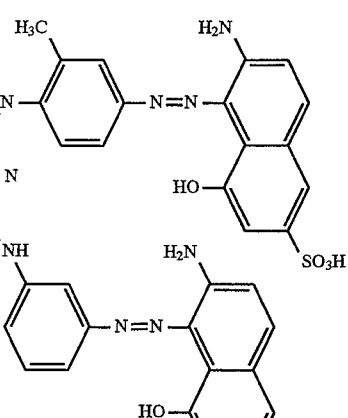 | Red |
| 59 | 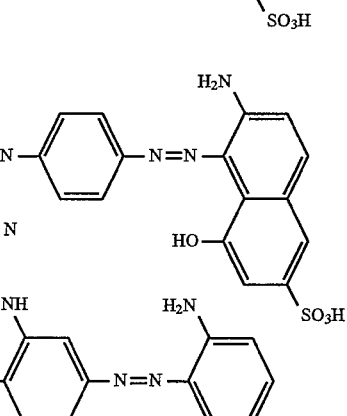 | Red |

TABLE 3-continued

| Ex. | Dye | Colour shade |
|---|---|---|
| 60 | (structure) | Red |
| 61 | (structure) | Red |
| 62 | (structure) | Red |

TABLE 3-continued

| Ex. | Dye | Colour shade |
|---|---|---|
| 63 | 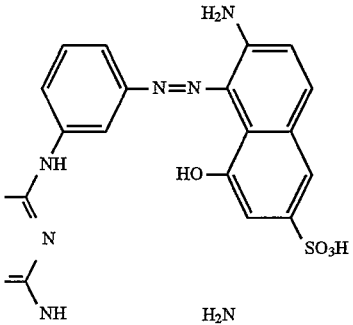 | Red |
| 64 | 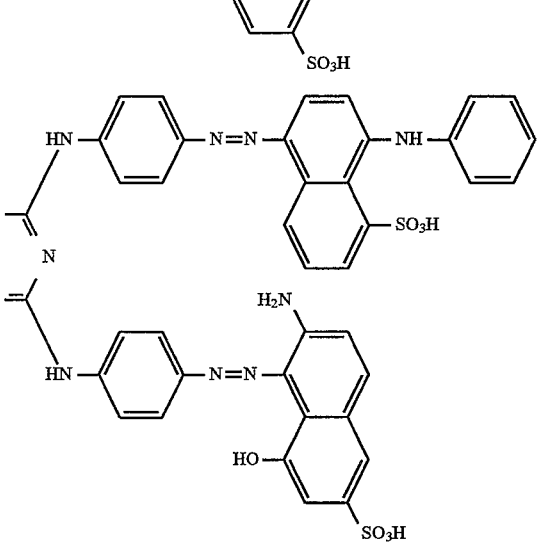 | Red |

Dyeing instructions I: 10 parts of polyamide 6.6 fibre material (Helanca tricot) are dyed in 500 parts of an aqueous liquor which comprises 2 g/l of ammonium acetate and is brought to pH 5 with acetic acid. The content of the dye according to Example 1 is 1.2%, based on the fibre weight. The dyeing time at a temperature of 98° C. is 30 to 90 minutes. The dyed fibre material is then removed from the liquor and washed and dried in the customary manner. A piece of fabric which has been dyed red and has good overall fastnesses is obtained.

Dyeing instructions II: 10 parts of woolen knitting yarn are stirred at 30° C. into a dyebath which comprises 0.6 part of the dye according to Example 1, 5 pans of sodium sulfate and 2 parts of sodium acetate per 100 parts of water and is brought to a pH of 4.5 with acetic acid (80%). The liquor is brought to the boiling point in the course of 45 minutes and kept at the boiling point for a further 45 to 70 minutes. The dyed goods are then removed, rinsed thoroughly with cold water and dried. A red dyeing on wool with good fastness properties is obtained.

Dyeing instructions III: 100 parts of clothing suede leather are drummed at 50° C. in a solution of 1000 parts of water and 2 parts of 24% ammonia for 2 hours and then dyed at 60° C. in a solution of 1000 parts of water, 2 parts of 24% ammonia and 3 parts of dye according to Example 1 for one hour. Thereafter, a solution of 40 parts of water and 4 parts of 85% formic acid is added and dyeing is carried out for a further 30 minutes. The leathers are then rinsed thoroughly and if appropriate further treated with 2 parts of a dicyandiamide-formaldehyde condensation product at 50° C for 30 minutes. A red dyeing with good overall fastnesses is obtained.

What is claimed is:

1. An azo dye of the formula

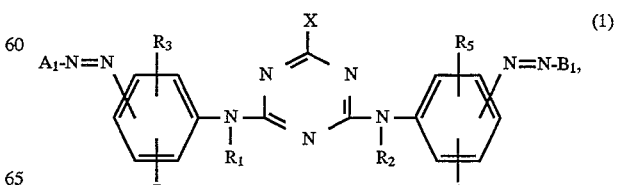 (1)

in which $R_1$ and $R_2$ independently of one another are hydrogen or $C_1$–$C_4$alkyl, $R_3$, $R_4$, $R_5$ and $R_6$ independently of one another are hydrogen, $C_1$–$C_4$alkyl, $C_1$–$C_4$alkoxy, $C_1$–$C_4$alkanoylamino, ureido or halogen, X is chlorine or fluorine, $B_1$ is a phenyl naphthyl or heterocyclic radical, and $A_1$ is a radical of the formula

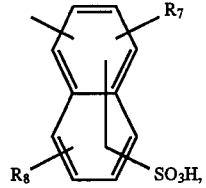 (2)

in which $R_7$ is hydrogen, amino, N-mono- or N,N-di-$C_1$–$C_4$alkylamino or phenylamino which is unsubstituted or substituted in the phenyl ring by $C_1$–$C_4$alkyl, $C_1$–$C_4$alkoxy, $C_2$–$C_4$alkanoylamino, ureido, halogen or sulfo and $R_8$ is hydrogen or hydroxyl, or $A_1$ is a radical of the formula

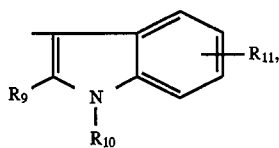 (3)

in which $R_9$ is hydrogen, $C_1$–$C_8$alkyl or phenyl which is unsubstituted or substituted by $C_1$–$C_4$alkyl, $C_1$–$C_4$alkoxy, $C_1$–$C_4$alkanoylamino, ureido, halogen or sulfo, $R_{10}$ is hydrogen or $C_1$–$C_8$alkyl and $R_{11}$ is hydrogen, $C_1$–$C_4$alkyl, $C_1$–$C_4$alkoxy, $C_2$–$C_4$alkanoylamino, ureido, halogen or sulfo, and the azo dye of the formula (1) contains at least one and not more than two sulfo groups, with the proviso that the radical of the formula (2) is not 6-sulfonaphth-2-yl.

2. An azo dye according to claim 1, in which $R_1$ and $R_2$ are hydrogen.

3. An azo dye according to claim 1, in which $R_3$, $R_4$, $R_5$ and $R_6$ independently of one another are hydrogen, $C_1$–$C_4$alkyl, $C_1$–$C_4$alkoxy or halogen.

4. An azo dye according to claim 1, in which $R_3$, $R_4$, $R_5$ and $R_6$ are hydrogen.

5. An azo dye according to claim 1, in which $R_7$ is hydrogen, amino or phenylamino.

6. An azo dye according to claim 1, in which $R_9$ is phenyl which is unsubstituted or substituted by $C_1$–$C_4$alkyl, $C_1$–$C_4$alkoxy or halogen, $R_{10}$ is hydrogen and $R_{11}$ is sulfo.

7. An azo dye according to claim 1, in which $B_1$ is a radical of the formula

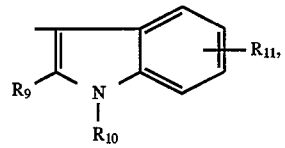 (3)

in which $R_9$ is hydrogen, $C_1$–$C_4$alkyl or phenyl which is unsubstituted or substituted by $C_1$–$C_4$alkyl, $C_1$–$C_4$alkoxy, $C_1$–$C_4$alkanoylamino, ureido, halogen or sulfo, $R_{10}$ is hydrogen or $C_1$–$C_8$alkyl and $R_{11}$ is hydrogen, $C_1$–$C_4$alkyl, $C_1$–$C_4$alkoxy, $C_1$–$C_4$alkanoylamino, ureido, halogen or sulfo; or a radical of the formula

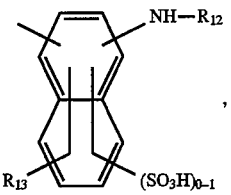 (4)

in which $R_2$ is hydrogen, $C_1$–$C_4$alkyl or phenyl which is unsubstituted or substituted by $C_1$–$C_4$alkyl, $C_1$–$C_4$alkoxy, $C_1$–$C_4$alkanoylamino, ureido, halogen or sulfo and $R_{13}$ is hydrogen, alkyl, $C_1$–$C_4$alkoxy, $C_2$–$C_4$alkanoylamino, ureido, halogen or hydroxyl; or a radical of the formula

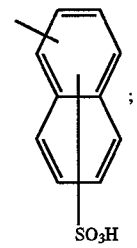 (5)

or a radical of the formula

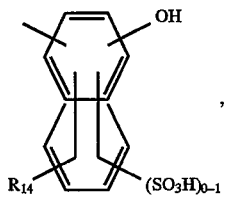 (6)

in which $R_{14}$ is hydrogen, $C_1$–$C_4$alkyl, $C_1$–$C_4$alkoxy, $C_1$–$C_4$alkanoylamino, ureido or halogen; or a radical of the formula (7)

in which $R_{15}$ and $R_{16}$ independently of one another are hydrogen or $C_1$–$C_4$alkyl which is unsubstituted or substituted by hydroxyl or phenyl, in which the phenyl radical is unsubstituted or substituted by $C_1$–$C_4$alkyl, $C_1$–$C_4$alkoxy, $C_2$–$C_4$alkanoylamino, ureido, halogen or sulfo, and $R_{17}$ and $R_{18}$ independently of one another are hydrogen, $C_1$–$C_4$alkyl, $C_1$–$C_4$alkoxy, $C_2$–$C_4$alkanoylamino, ureido, halogen or sulfo;

or a radical of the formula

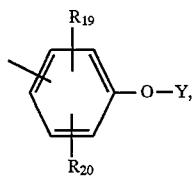     (8)

in which

Y is hydrogen or $C_1$–$C_4$alkyl which is unsubstituted or substituted by hydroxyl and $R_{19}$ and $R_{20}$ independently of one another are hydrogen, $C_1$–$C_4$alkyl, $C_1$–$C_4$alkoxy, $C_2$–$C_4$alkanoylamino, ureido, halogen or sulfo;

or a radical of the formula

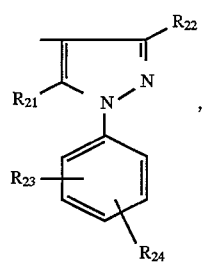     (9)

in which $R_{21}$ is amino or hydroxyl, $R_{22}$ is methyl or carboxyl and $R_3$ and $R_{24}$ independently of one another are hydrogen, $C_1$–$C_4$alkyl, $C_1$–$C_4$alkoxy, $C_2$–$C_4$alkanoylamino, ureido, halogen or sulfo;

or a radical of the formula

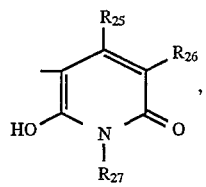     (10)

in which $R_{25}$ is hydrogen or $C_1$–$C_4$alkyl, $R_{26}$ is cyano, carbamoyl or sulfomethyl and $R_{27}$ is hydrogen, $C_1$–$C_4$alkyl or phenyl which is unsubstituted or substituted by $C_1$–$C_4$alkyl, $C_1$–$C_4$alkoxy, $C_2$–$C_4$alkanoylamino, ureido, halogen or sulfo.

8. An azo dye according to claim 7, in which $B_1$ is a radical of the formula (3), (4) or (5).

9. An azo dye according to claim 7, in which $B_1$ is a radical of the formula (3), (4) or (5), $R_1$ and $R_2$ are hydrogen, $R_3$, $R_4$, $R_5$ and $R_6$ independently of one another are hydrogen, $C_1$–$C_4$alkyl, $C_1$–$C_4$alkoxy or halogen, $R_7$ is hydrogen, amino or phenylamino, $R_9$ is phenyl which is unsubstituted or substituted by $C_1$–$C_4$alkyl, $C_1$–$C_4$alkoxy or halogen, $R_{10}$ is hydrogen and $R_{11}$ is sulfo.

10. An azo dye according to claim 1, in which $A_1$ and $B_1$ independently of one another are a radical of the formula

     (5)

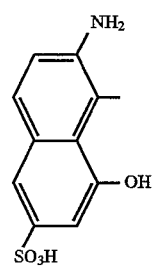     (11)

or

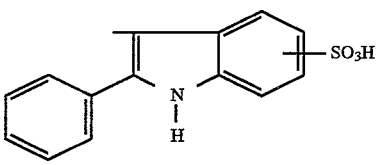     (13)

in which $A_1$ as a radical of the formula (5) is not 6-sulfonaphth-2-yl.

11. An azo dye according to claim 10, in which $A_1$ and $B_1$ independently of one another are a radical of the (5) or (11).

12. An azo dye according to claim 1, in which $A_1$ and $B_1$ are identical.

13. An azo dye according to claim 1, of the formula

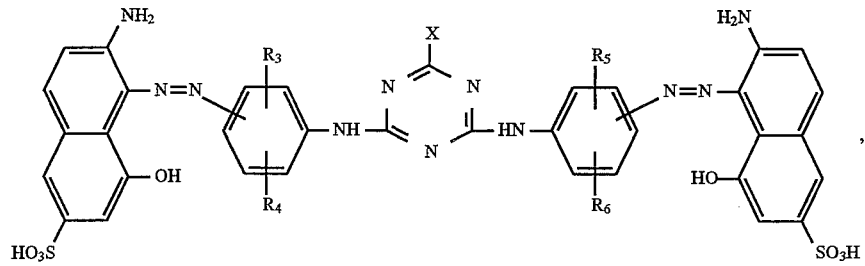     (14)

in which $R_3$, $R_4$, $R_5$ and $R_6$ independently of one another are hydrogen, $C_1$–$C_4$alkyl, $C_1$–$C_4$alkoxy or halogen.

14. A process for the preparation of an azo dye according to claim 1, which comprises subjecting cyanuric chloride or cyanuric fluoride to a condensation reaction with the amines of the formulae

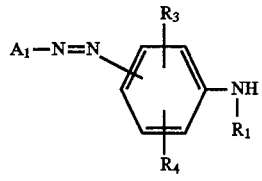 (15)

and

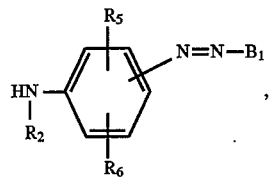 (16)

in which $R_1, R_2, R_3, R_4, R_5, R_6, A_1$ and $B_1$ are as defined in claim 1.

15. A process for dyeing or printing fibre material containing hydroxyl groups or nitrogen, or paper or leather, which process comprises the step of applying to said materials a tinctorial amount of an azo dye according to claim 1.

16. A process according to claim 13 wherein the material to be dyed or printed is naturally occurring or synthetic polyamide fibre material.

* * * * *